(12) United States Patent
Urhahne

(10) Patent No.: US 8,239,126 B2
(45) Date of Patent: Aug. 7, 2012

(54) METHOD AND DEVICE FOR EVALUATING THE DRIVING STYLE OF A DRIVER IN A MOTOR VEHICLE WITH RESPECT TO THE USE OF FUEL

(75) Inventor: Joseph Andreas Urhahne, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 588 days.

(21) Appl. No.: 12/469,969

(22) Filed: May 21, 2009

(65) Prior Publication Data

US 2010/0057335 A1    Mar. 4, 2010

(30) Foreign Application Priority Data

Aug. 27, 2008 (DE) .................. 10 2008 041 618

(51) Int. Cl.
*G06F 19/00* (2011.01)
(52) U.S. Cl. ..................... 701/123; 701/103; 701/104

(58) Field of Classification Search ................... 701/93, 701/103–104, 123
See application file for complete search history.

(56) References Cited

U.S. PATENT DOCUMENTS

| 4,747,051 A * | 5/1988 | Hall et al. ................. 701/93 |
| 2004/0216450 A1 * | 11/2004 | Okazaki et al. ............. 60/285 |
| 2009/0138172 A1 * | 5/2009 | Okazaki et al. ............. 701/103 |

FOREIGN PATENT DOCUMENTS

| EP | 0145280 | 8/1988 |
| WO | WO 00/07150 | 2/2000 |

* cited by examiner

*Primary Examiner* — Hussein A. Elchanti
(74) *Attorney, Agent, or Firm* — Julia Voutyras; Alleman Hall McCoy Russell & Tuttle LLP

(57) ABSTRACT

The disclosure describes a method and a system for evaluating the driving style of a driver in a motor vehicle with respect to the use of fuel. A disclosed method includes: determining a first value which is characteristic of the current speed of the vehicle; calculation of a second value by low-pass filtering said first value; and evaluating of the driving style with respect to the use of fuel by evaluating the difference between said first value and said second value.

5 Claims, 9 Drawing Sheets

METHOD AND DEVICE FOR EVALUATING THE DRIVING STYLE OF A DRIVER IN A MOTOR VEHICLE WITH RESPECT TO THE USE OF FUEL

The present application relates to a system and a method for evaluating the driving style of a driver in a motor vehicle with respect to the use of fuel.

The problem of $CO_2$ emissions is currently being discussed extensively in the international politics and in scientific research, in which context in particular the automobile industry is being called upon to reduce its contribution to $CO_2$ emissions and to global warming. A particular contribution to reducing $CO_2$ emissions can be made by developing fuel-efficient internal combustion engines and drivetrains together with alternative $CO_2$-neutral fuels.

However, there is also a large potential in inducing the driver of a motor vehicle to make a contribution to reducing the fuel consumption through his driving style. If a driver drives, for example, at a short distance from a vehicle travelling ahead, frequent braking processes and acceleration processes result in poor use of fuel. If, on the other hand, the driver keeps a relatively large distance, it is easier for him to maintain a constant speed, and this leads to more efficient use of fuel.

WO 00/07150 discloses a method for making available advice to the user of a motor vehicle in which various vehicle-internal factors such as the speed of the vehicle, the position of the gear selector lever, the engine speed, the accelerations which occur, the position of the accelerator pedal and of the brake pedal, the position of the steering wheel, the steering angle speed and the fuel consumption are monitored and stored during the driving mode. Furthermore, ambient factors such as the gradient of the route being travelled on, speed limits, the distance and the difference in speed with respect to vehicles travelling ahead as well as the global position of the vehicle are also taken into account. Recommendations which are made available to the user of the motor vehicle at regular intervals during the journey in order to bring about improved use of the fuel are then derived from the determined data.

EP 0 145 280 A1 discloses a device for displaying the fuel consumption in a vehicle by generating an output signal which is indicative of the ratio of the fuel quantity which is actually consumed for a distance travelled with respect to the average quantity of the fuel consumed for the distance.

The present application is directed to a method and a system for evaluating the driving style of a vehicle in a motor vehicle with respect to the use of fuel, which method and system permit a driver to be induced to adopt a driving style which is economical in terms of fuel and predictive where at the same time comparatively little computational complexity is involved and there is no need for a complex sensor system.

Accordingly, a method for evaluating a driving style of a driver in a motor vehicle with respect to the use of fuel includes: determining a first value indicative of a current speed of the vehicle; calculating a second value by low-pass filtering of said first value; and evaluating the driving style with respect to the use of fuel by evaluating the difference between said first value and said second value.

Since, according to an embodiment of the present disclosure, the difference between the respective current (unfiltered) value of the speed of the vehicle and a low-pass-filtered value of the speed of the vehicle is formed and the difference (in particular its absolute value) is then used for further assessment of the driving style, a value of an evaluation parameter which characterizes the driving style which is economical in terms of fuel and/or predictive can be determined and signaled to the driver, without a complicated sensor system, in order to optimize his driving style because the more predictive the way in which the driver drives (in particular by maintaining a sufficient distance from the vehicle travelling ahead) the fewer the sudden changes in speed he is obliged to make. Signaling the driving style permits the driver to correct his driving style in a targeted fashion, in a different way than would be made possible by information about generally high fuel consumption, which can also be due to other influencing factors such as, for example, a cold start, the presence of unfavorable switching times or the frequent occurrence of an engine operating mode in the idling state when the vehicle is stationary.

In particular, this embodiment only requires a comparatively small computing capacity since, apart from the low-pass-filtering operation (to be carried out only once for each computing cycle), no further steps which are intensive in terms of computing or require a large amount of processor capacity have to be carried out. Therefore, this can be implemented easily by using existing microprocessors and within the scope of existing background loops which are carried out periodically by these microprocessors, with the result that there is no need for any additional hardware equipment, especially since the speed signal which is required is available in digital form in a new vehicle. Owing to the simple computing operations to be carried out, there is also no need for additional computing power to be made available in the vehicle, for example by using more powerful hardware.

According to one embodiment, the evaluation of the difference between the first value and the second value comprises speed-dependent weighting of the absolute value of this difference. In particular, at relatively high velocities, the differences between the unfiltered and the filtered value of the speed of the vehicle can be weighted to a greater extent, as a result of which it is possible to allow for the greater influence of these differences on the fuel consumption at relatively high speeds.

According to another embodiment, the evaluation of the difference between the first value and the second value also comprises a comparison between the weighted absolute value, which is obtained on the basis of the speed-dependent weighting of the absolute value, and a predefined ideal value. This ideal value constitutes a calibration factor and marks the empirically determined limit between predictive and non-predictive driving behavior.

In the present exemplary embodiment, the ideal value is permanently predefined, and the absolute value of the difference is provided with a weighting factor. Of course it is mathematically equivalent not to modify the difference value and to multiply the ideal value by a weighting factor (which is reciprocal to the abovementioned weighting factor).

Although a comparison of the weighted absolute difference with a permanently predefined ideal value has proven to be a reliable measure of predictive driving, additional weighting factors can also be introduced, and this is specifically possible in a way which is surprisingly relatively independent of whether the route is on the flat or mountainous or straight or sinuous. Said weighting factors could take into account, for example, the topology of the route such as can be determined, for example, on the basis of a navigation system and increase the ideal value, for example on particularly sinuous routes.

According to one embodiment, the method described above is carried out repeatedly, in particular periodically, during the ongoing operation of the vehicle.

According to one embodiment, the evaluation of the driving style is carried out with respect to the use of fuel on the basis of an evaluation parameter whose value is either incremented or decremented in a predefined increment or kept unchanged as a function of the result of the evaluation of the difference between the first signal and the second signal. Given periodic calculation of differences between the speed and the filtered speed (e.g. every 14 ms), a relatively small value is preferably selected for the increment, e.g. 0.001, in order avoid severe fluctuations of the evaluation parameter.

In one alternative embodiment, the evaluation of the difference between the first value and the second value can comprise the calculation of the integral of the absolute value, weighted if appropriate as explained above, of this difference over a predefined time interval, for example 60 s. In this embodiment, this integral is compared with a predefined reference value after the expiry of the integration time, and the value of the evaluation parameter is either incremented, decremented or kept unchanged as a function of the result of this comparison. In this embodiment, additional averaging is achieved by taking into account the integral of the difference. However, it is disadvantageous that the evaluation parameter is adapted only relatively rarely during relatively long integration times, which leads to a relatively inert reaction of the evaluation parameter.

The disclosure also describes a system for evaluating the driving style of a driver in a motor vehicle with respect to the use of fuel in which the system includes a controller for determining a first value which is characteristic of the current speed of the vehicle, the controller calculating a second value by low-pass filtering of the first value, and calculating an evaluation parameter for evaluating the driving style with respect to the use of fuel by evaluating the difference between the first value and the second value.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DRAWINGS

Figure 1:
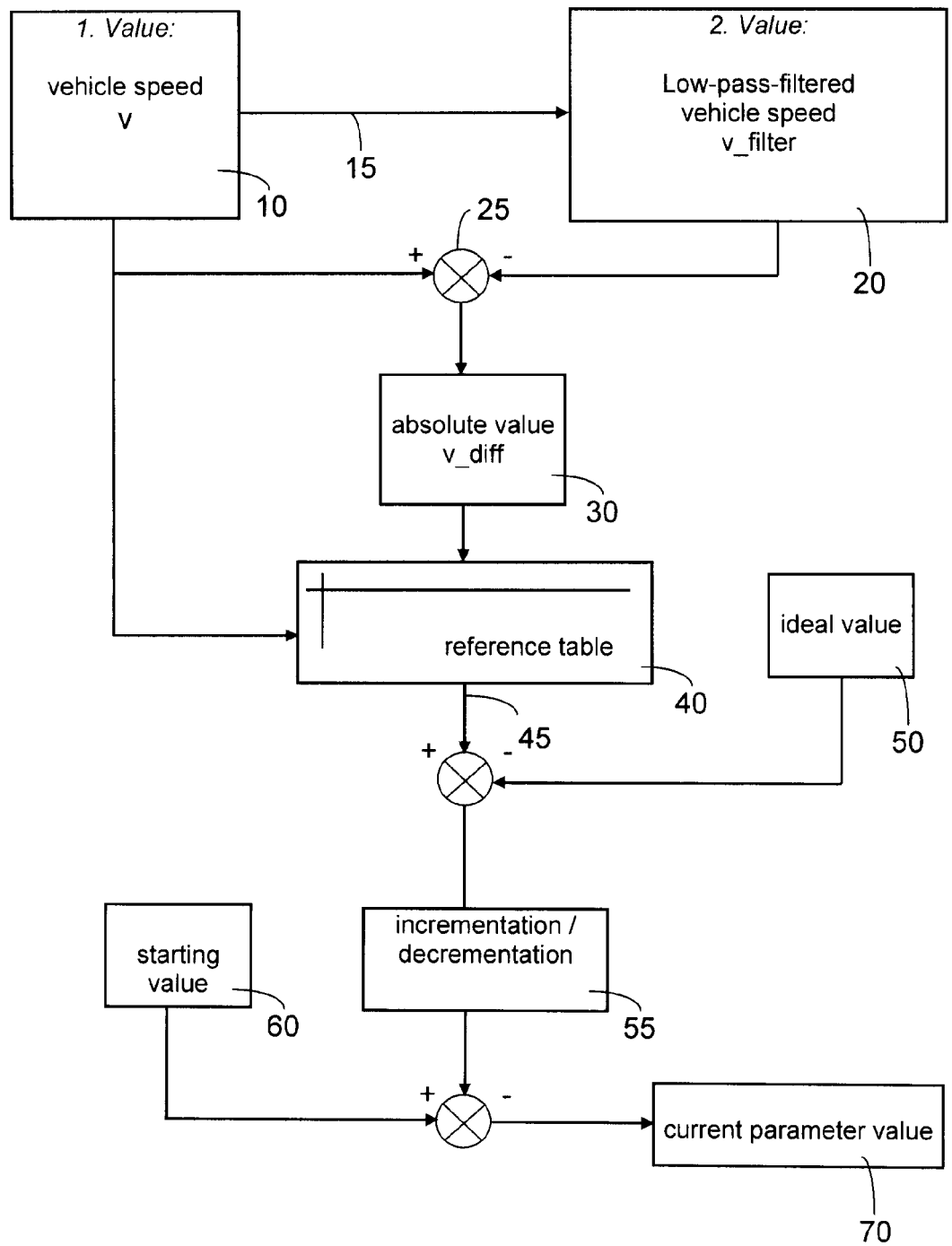
FIG. 1 is a flowchart illustrating an exemplary embodiment of the present disclosure.

According to FIG. 1, in the case of the algorithm which is applied according to the exemplary embodiment, the currently measured speed v of the vehicle is made available as an (unfiltered) value 10, e.g. as a mean value of the signal from all the wheel speed sensors. Furthermore, this value 10 is subjected to a low-pass-filtering operation 15 with a filter constant of the order of magnitude of 2.5 s in order to determine, as a further value 20, a low-pass-filtered vehicle speed v_filter. The values 10 and 20 are fed to a difference block 25, and the absolute value v_diff of the difference between the values 10 and 20 is modified or weighted on the basis of a speed-dependent reference table ("lookup table") 40. This reference table 40 is used to modify the previously determined absolute value 30 (=v_diff) by taking into account the current speed of the vehicle, in which case when there are relatively high speeds stronger weighting of the differences, characterized by the absolute value v_diff, between the unfiltered and the filtered signal of the speed of the vehicle is carried out.

In a subsequent subtraction state, differences are formed between the absolute value 45, weighted on the basis of the reference table 40, and an ideal value 50. Depending on whether this difference is greater than or smaller than zero, the currently applicable value of the evaluation parameter (i.e. a starting value 60 when the algorithm is first carried out, the last applicable current parameter value 70 of the evaluation parameter whenever the algorithm is carried out again) is increased or decreased by a predefined increment in a subsequent incremental stage 55. The current value of the evaluation parameter 70 which is obtained by this incrementation is output. In this context, for example, the value range of the evaluation parameter can be limited to the values 0, 1, 2, 3, 4 and 5 (without the invention being restricted to specific values), in which case a relatively large value of the evaluation parameter stands for a driving style which is relatively economical in terms of fuel, with the result that, in this example, a best possible value of "5" and the worst possible value of "0" can be achieved for the evaluation parameter (in which case the evaluation parameter is then also kept constant if further decrementation or incrementation would have to take place after the minimum or maximum value was reached).

After the steps that are illustrated in FIG. 1 have been executed, the algorithm is carried out again, in which case a typical duration of a cycle may only be exemplary and can be approximately 14 milliseconds (ms) depending on the respective surrounding electronics. During each cycle, the difference value or absolute value, which is weighted as a function of the speed, from the unfiltered speed signal and the filtered speed signal is therefore compared with the defined ideal value and the evaluation parameter which is used for the evaluation of the driving style in terms of the saving of fuel is increased or decreased depending on whether this ideal value is exceeded or undershot. The increment size of the increase or decrease is dependent on the frequency of execution of the algorithm and of the desired maximum rate of change of the evaluation parameter. It is basically also possible to provide different sizes of increment for the increase and decrease of the evaluation parameter.

Even if an increment for the evaluation parameter which as been determined last is identified during each cycle or passage through the algorithm in the exemplary embodiment described above, the invention is not restricted to this. According to a further embodiment which differs from the algorithm in FIG. 1, the absolute value which is determined by forming differences between the unfiltered signal and the filtered signal of the speed of the vehicle can also be integrated, if appropriate after weighting, over a suitable time interval (for example 60 seconds). It is then possible to evaluate whether or not the integral value which is obtained in this way has reached a specific threshold value after the respective time interval. If the threshold value is exceeded, the evaluation parameter can, for example, be reduced by one in order thereby to signal that in the previous time interval (of 60 seconds in the example) a driving style which was unfavorable with respect to the use of fuel was occurring.

Figure 2A:
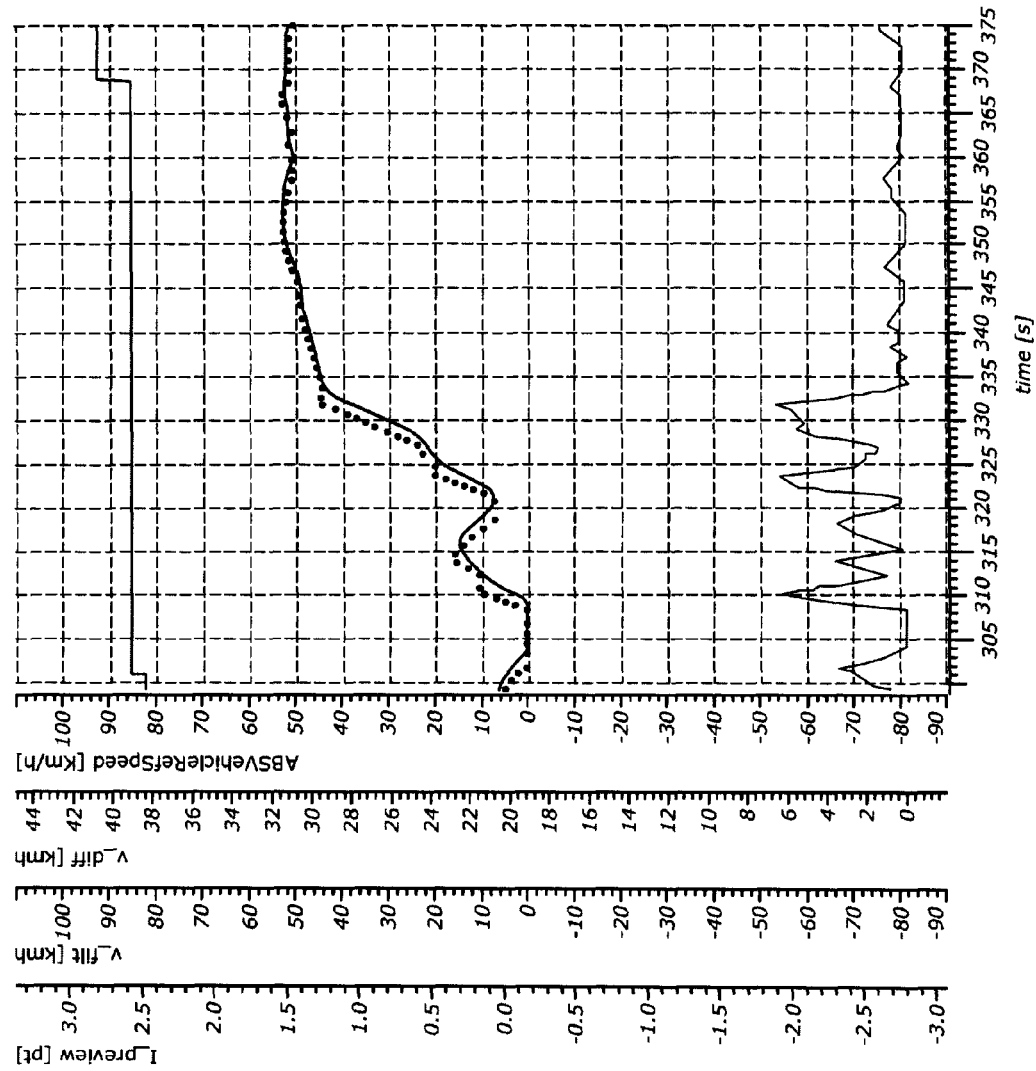
FIGS. 2a and 2b comprise a diagram in which exemplary time-dependences of signals which are evaluated in the method in FIG. 1 and of the evaluation parameter which is determined therefrom are plotted.
Figure 2B:
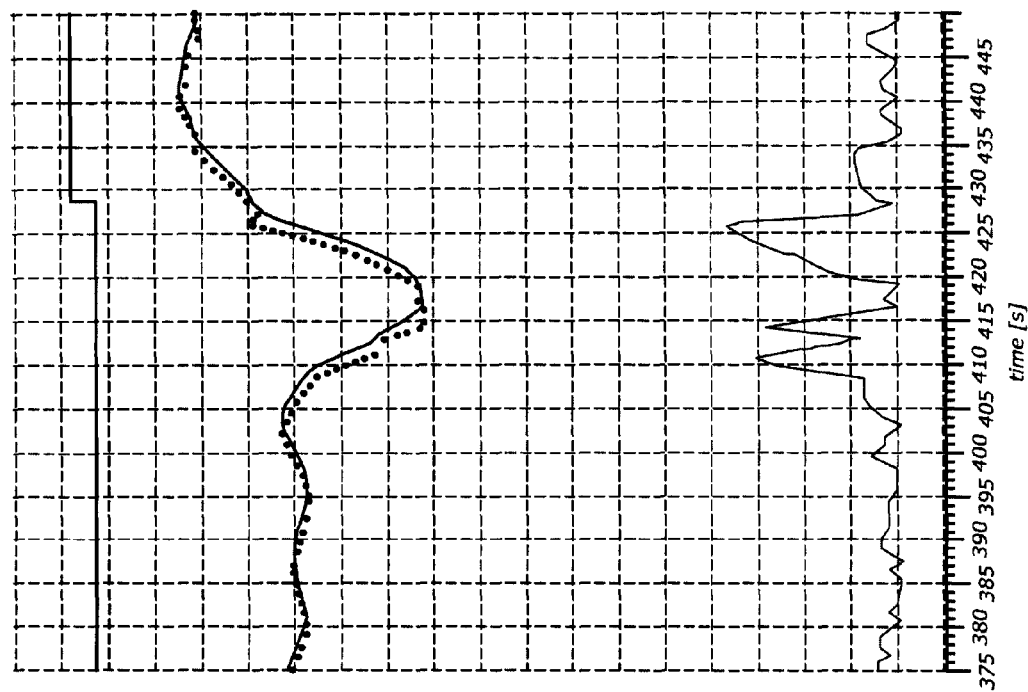
Figure 3A:
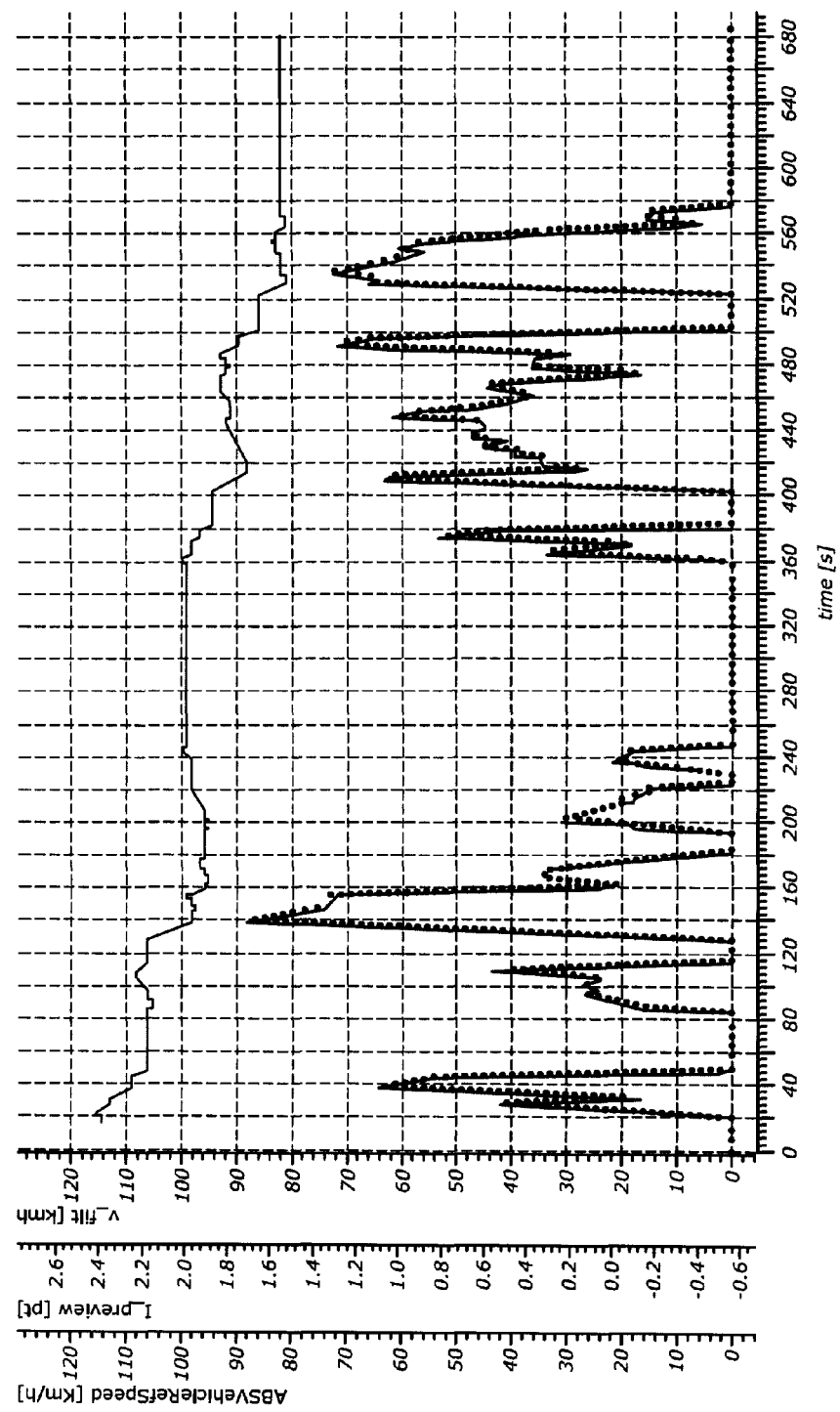
FIGS. 3a-c show exemplary, time-dependent profiles of an evaluation parameter which is determined according to an embodiment of the present disclosure and which has been determined during a journey on a comparatively flat route as well as for a sporty driving style (FIG. 3a) and for a driving style which is economical in terms of fuel (FIGS. 3b-c)
Figure 3B:
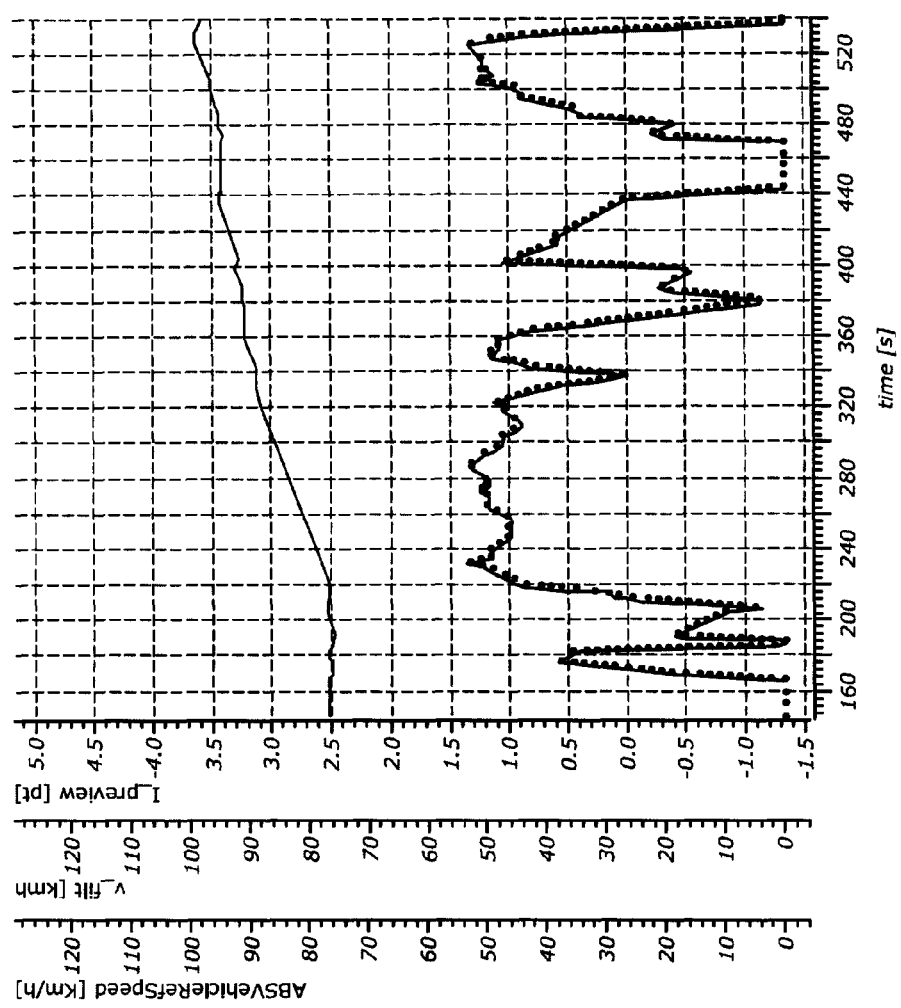
Figure 3C:
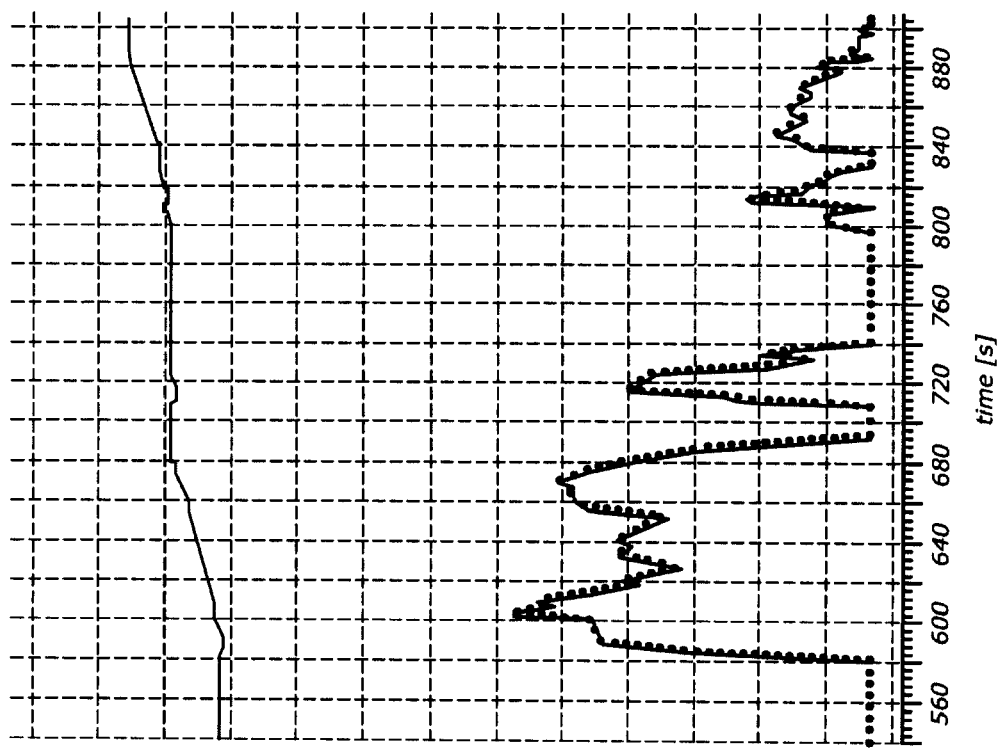

FIGS. 2a-b show a diagram in which exemplary time dependences of the signals which are evaluated in the method in FIG. 1 are plotted. In each case the following are plotted: the time-dependent profiles of the current speed of the vehicle v (as an unfiltered value 10), of the low-pass-filtered speed of the vehicle v_filter (as a filtered value 20), of the absolute value 30 which is obtained by forming differences between the values 10 and 20, and of the evaluation parameter which is determined on the basis of the flowchart in FIG. 1.

In the illustrated example, the value of the evaluation parameter rises from an initial value of somewhat less than 2.5 after only a few seconds to a value of somewhat more than 2.5. If it is assumed, for example, that the indicated value range of the evaluation parameter is limited to the integral values 0, 1, 2, 3, 4 and 5, and if therefore only a rounded value is output with respect to the parameter value, this means that even after a very short time period an improvement in the driver's driving style with respect to the use of fuel is signaled to him and the driver is therefore quickly encouraged to continue to adopt a driving style which is economical in terms of fuel.

Figure 4A:
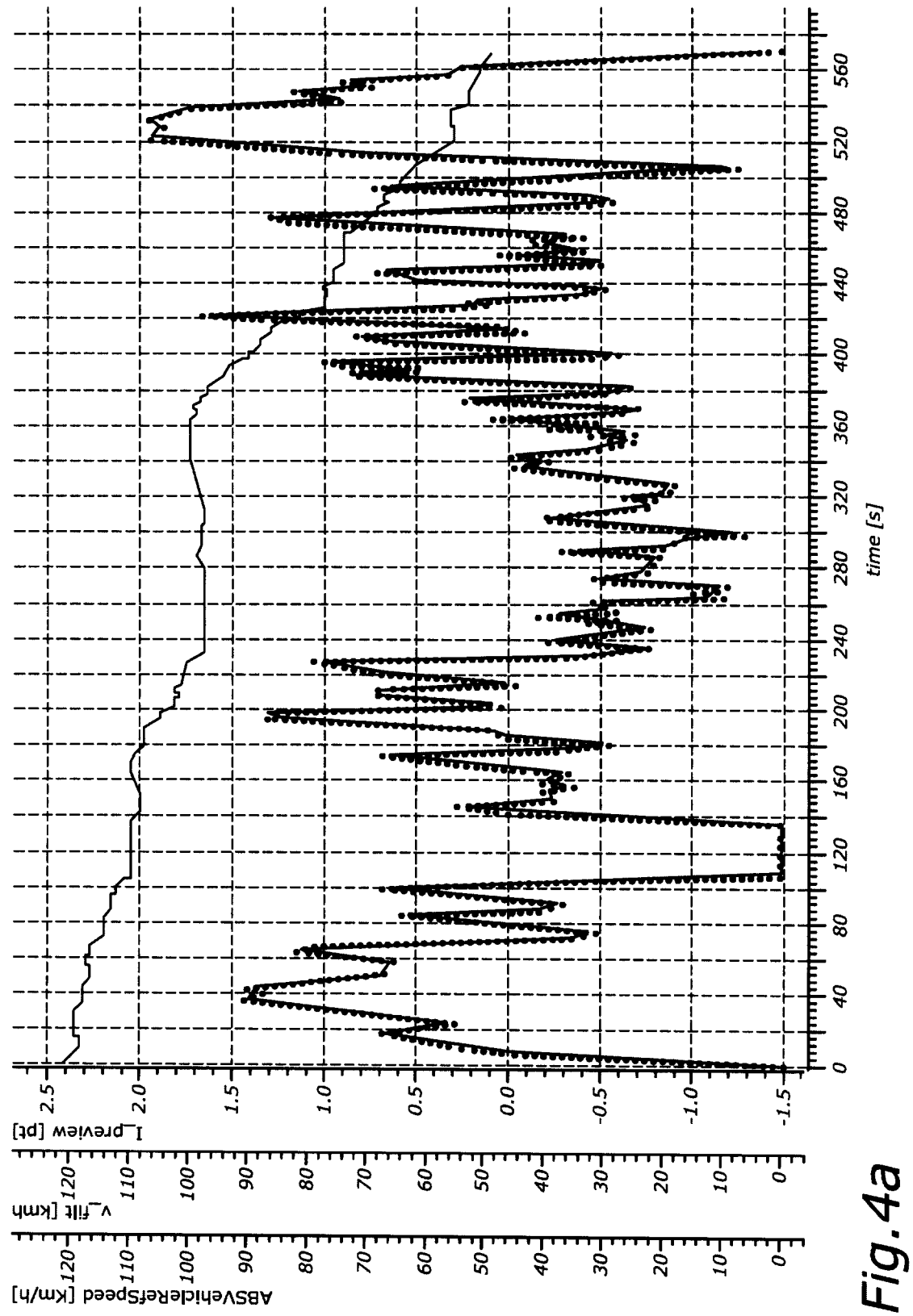
FIGS. 4a-c show exemplary time-dependent profiles of an evaluation parameter which is determined according to the invention and which has been determined during a journey on a comparatively mountainous route both for a sporty driving style (FIG. 4a) and for a driving style which is economical in terms of fuel (FIGS. 4b-c).
Figure 4B:
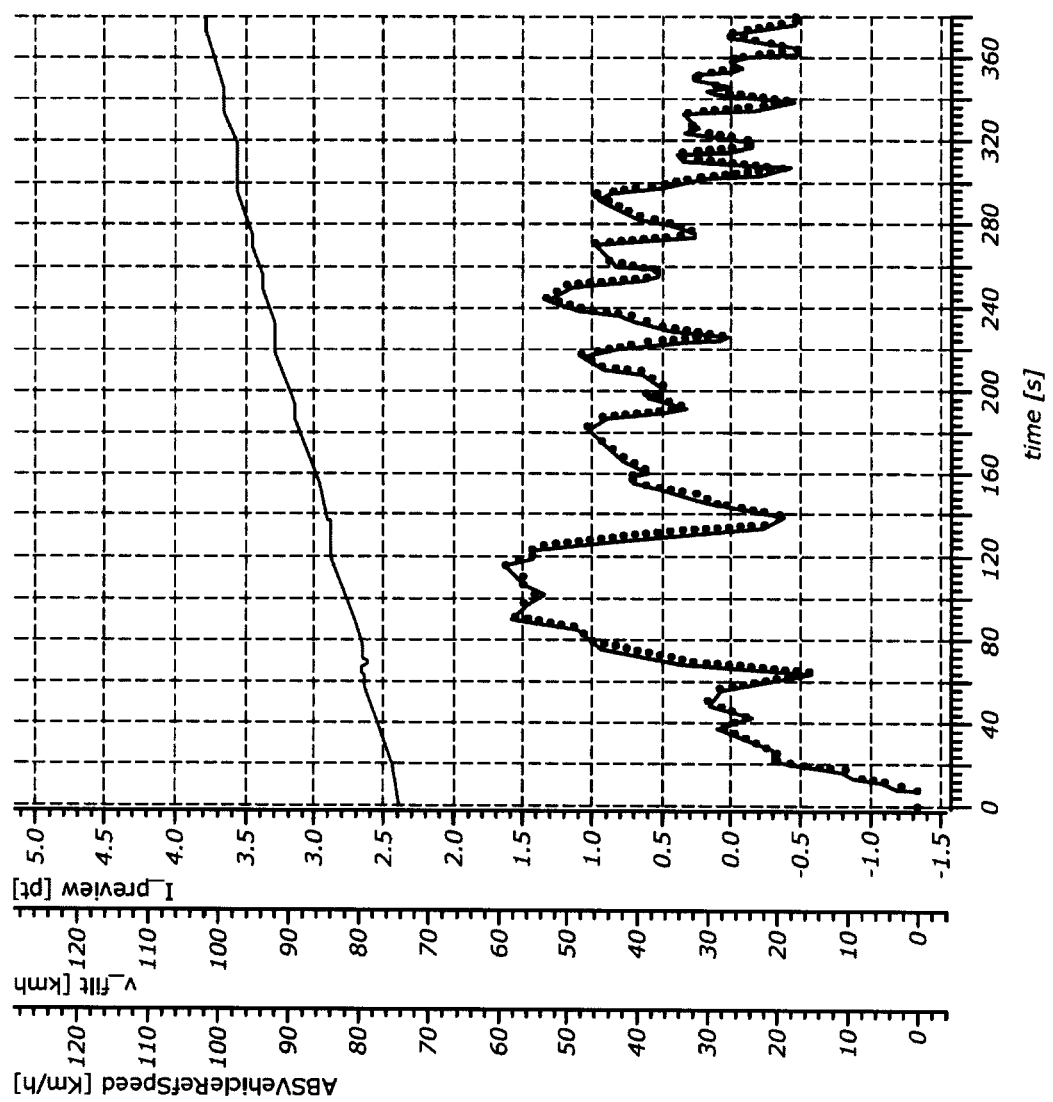
Figure 4C:
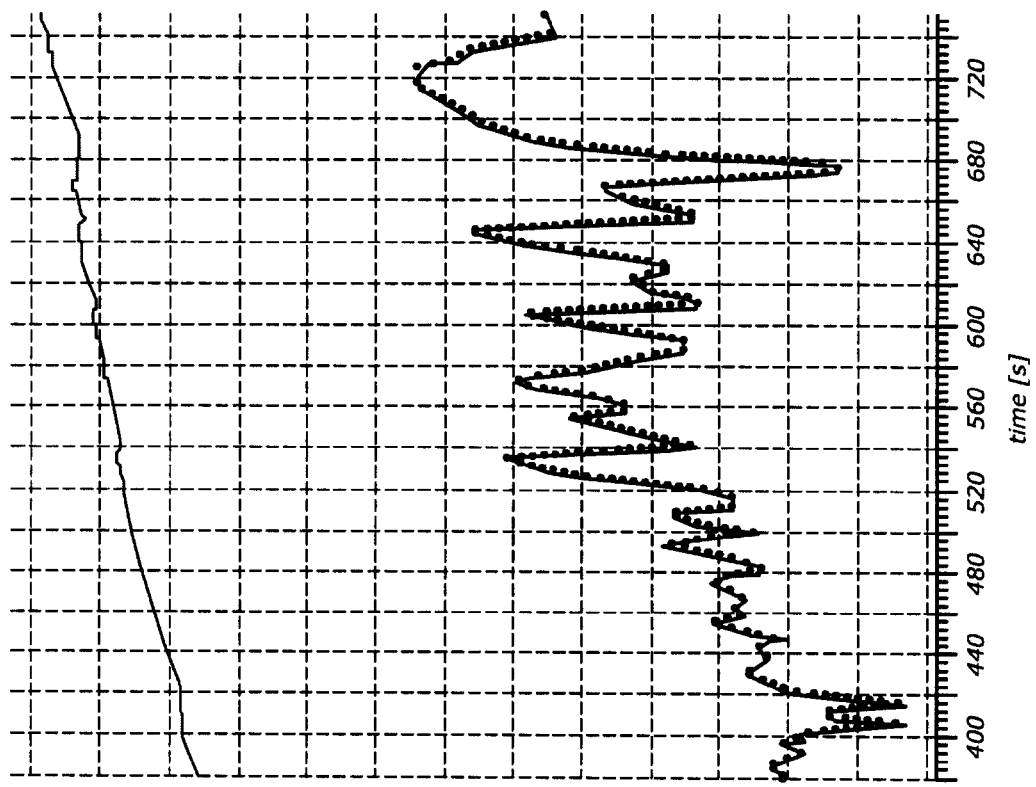

In FIGS. 3a-c and 4a-c the efficiency of the method according to the present disclosure is illustrated in that in each case the profile of the evaluation parameter which is used to evaluate the driving style with respect to the use of fuel is considered for a comparatively sporty driving style (FIG. 3a and FIG. 4a) and for a driving style which is comparatively economical in terms of fuel (FIGS. 3b-c and FIGS. 4b-c), with this comparison being made both for a relatively flat area (FIGS. 3a-c) and for a relatively mountainous area (FIGS. 4a-c). Both for a flat area and for a mountainous area, a sensitive dependence of the evaluation parameter on the driving style is apparent, with the driving style which is economical in terms of fuel giving rise, as expected, to a continuous increase in the values of the evaluation parameter in both cases, and the sporty driving style correspondingly resulting in a continuous decrease in the evaluation parameter.

It will be appreciated that the configurations and routines disclosed herein are exemplary in nature, and that these specific examples are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   determining a first value which is a current motor vehicle speed of a motor vehicle;
   calculating a second value by low-pass filtering said first value;
   evaluating a driving style with respect to fuel use of fuel by comparing a predefined ideal value to a speed-dependent weighting of an absolute value of a difference between said first value and said second value; and
   signaling the evaluated driving style to a driver of a motor vehicle.

2. The method as claimed in claim 1, wherein said method is carried out repeatedly during ongoing operation of the vehicle.

3. The method as claimed in claim 2, wherein the evaluation of the driving style is carried out with respect to fuel use of fuel on the basis of an evaluation parameter whose value is either incremented or decremented in a predefined increment or kept unchanged as a function of the result of said comparison.

4. The method as claimed in claim 3, wherein said absolute value of the difference between said first value and said second value further comprises an integral of the absolute value of this difference over a predefined time interval.

5. The method as claimed in claim 4, wherein the integral is compared with a predefined reference value and the value of the evaluation parameter is either incremented, decremented or kept unchanged as a function of the result of this comparison.

* * * * *